June 29, 1954     J. L. McBRIDE     2,682,422
SHAFT SEAL
Filed April 16, 1951
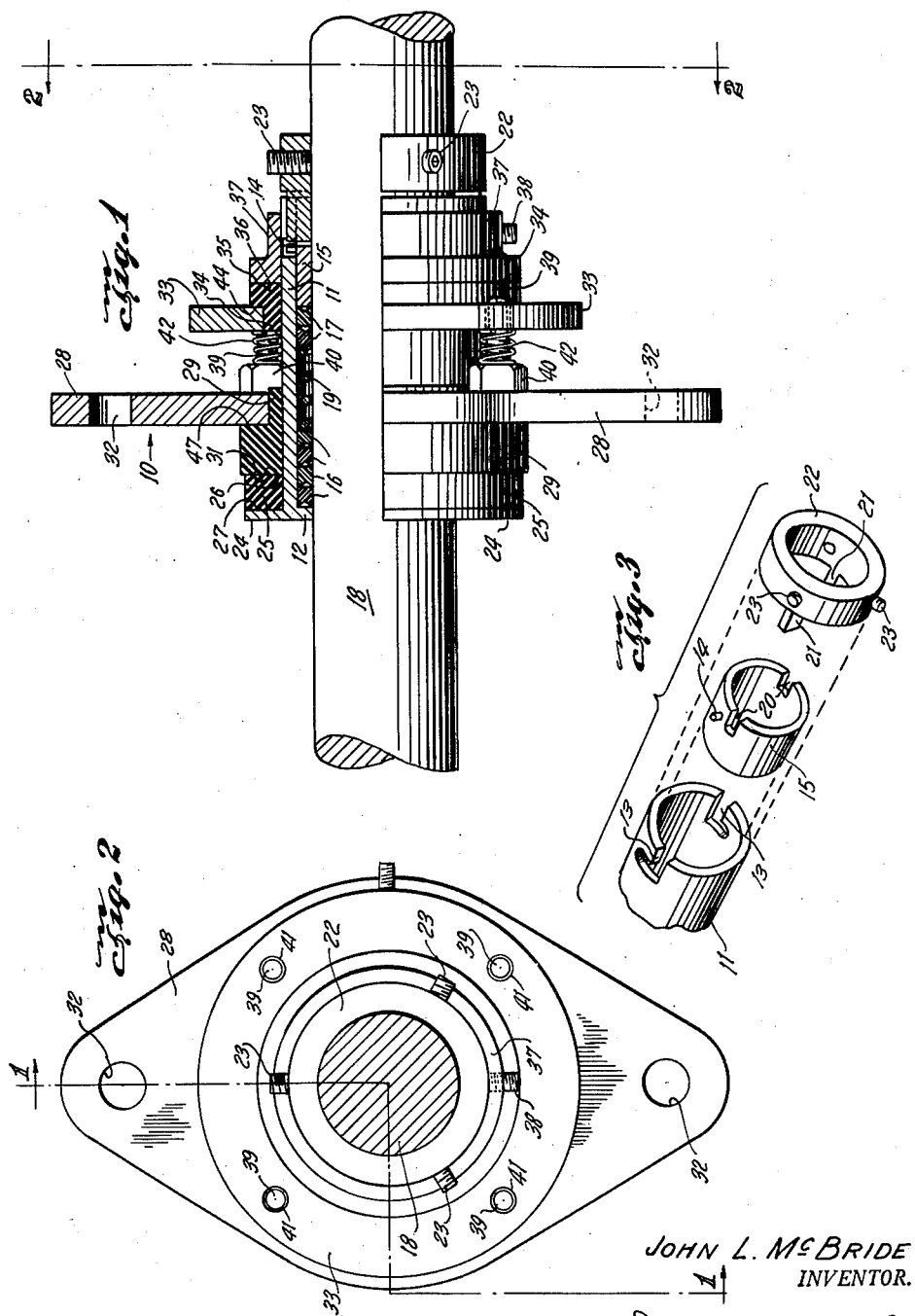
JOHN L. McBRIDE
INVENTOR.
ATTORNEY Patented June 29, 1954

2,682,422

UNITED STATES PATENT OFFICE 2,682,422

SHAFT SEAL

John L. McBride, Baytown, Tex., assignor of one-half to C. T. Stewart, Baytown, Tex.

Application April 16, 1951, Serial No. 221,207

3 Claims. (Cl. 286—11.14)

This invention relates to seals and more particularly to fluid seal for rotating shafts.

A fluid seal must be provided for boat propeller shafts, pump shafts, and other rotatable shafts which pass through a housing or wall on one side of which is present fluid which must be prevented from leaking along the shafts. Since the seal necessarily comprises elements which are rigidly connected to the shaft having surfaces held in liquid tight contact with surfaces of elements rigidly connected to the housing, the contacting surfaces move with respect to each other as the shaft revolves. An automatic in-motion adjustment means must be provided which automatically compensates for the frictional wear of these surfaces as the shaft rotates. Moreover, in order to insure maximum life of the seal, another adjustment means must be provided which may be adjusted to compensate for the frictional wear of these surfaces over long periods of time which cannot be compensated by the in-motion adjustment means. Since the elements having contacting surfaces subject to frictional wear must be replaced from time to time, the seal should be adapted to be easily removed as a unit from the shaft, for disassembly and assembly at a workbench or other convenient working location.

Accordingly, it is an object of the invention to provide a new and improved fluid seal for rotating shafts.

It is another object of the invention to provide a new and improved fluid seal for rotating shafts having an automatic in-motion adjustment means for compensating for frictional wear between contacting surfaces.

It is still another object of this invention to provide a new and improved fluid seal for rotating shafts which can be removed and mounted on a shaft as a unit for disassembly and assembly away from the rotatable shaft.

Briefly stated, the new and improved fluid seal for rotating shafts comprises a cylindrical seal sleeve which is provided at one end with an annular flange which extends inwardly toward the rotatable shaft on which the seal sleeve is mounted. The other end of the seal sleeve is provided with a lock sleeve which telescopes into the seal sleeve and is held in place by a bayonet type slot and pin connection. Intermediate the inwardly extending annular flange and the lock are a plurality of packing rings, held under compression by a spring, which prevent leakage between the seal sleeve and the rotatable shaft. An outwardly extending annular flange on the seal sleeve has a seal face which bears against the seal face of the bushing of a blank gland which is adapted to be connected to a housing. The outwardly extending flange of the seal sleeve is biased toward the bushing by a plurality of compressed springs which bear against a tension gland mounted on the seal sleeve. An adjustment ring is mounted on the seal sleeve to move the tension gland relative to the blank gland in order to adjust the spring forces which hold the seal faces of the flange and the bushing against each other. Finally, a seal lock is rigidly secured to the rotatable shaft and engages the seal sleeve to lock the seal sleeve to the rotatable shaft. The seal lock is the only element of the fluid seal which is rigidly secured to the shaft so that remaining elements of the seal may be placed on the rotating shafts as a unit. The seal may be removed from the shaft as a unit by disconnecting the blank gland from the housing and sliding the seal sleeve and all elements mounted on it off the rotating shaft.

For a better understanding of the invention, reference may be had to the following description taken in connection with the accompanying drawing and its scope will be pointed out in the appended claims.

In the drawing,

Figure 1 is a partly sectional and partly side plan view, taken along the line 1—1 of Figure 2, of the fluid seal shown in position on a rotating shaft;

Figure 2 is a view taken along line 2—2 of Figure 1; and,

Figure 3 is an exploded view showing one end of the seal sleeve, the lock sleeve and the seal lock.

Referring now to the drawing, the fluid seal 10 comprises a cylindrical seal sleeve 11 which has at one end an inwardly extending annular flange 12. The other end of the seal sleeve 11 is provided with a pair of L-shaped slots 13 which are adapted to receive the outwardly extending pins 14 rigidly mounted on a lock sleeve 15 which is adapted to telescope into the seal sleeve 11.

The inwardly extending flange 12 and the lock sleeve 15 hold in place a plurality of packing rings 16 and 17 which fit in the seal sleeve 11 and bear against the rotating shaft 18 on which the fluid seal is mounted. A coil spring 19 yieldingly biases the rings 16 and 17 toward the flange 12 and the lock sleeve 15, respectively. Grease may be packed in the space between the rings 16 and 17 to lubricate the rotating shaft 18 and to prevent any jamming of the packing rings.

The lock sleeve 15 is provided with a pair of slots 20 which register with the slots 13 of the packing sleeve when the lock sleeve is in telescoped locked position with respect to the seal sleeve 11. The slots 13 and 20 receive the lugs 21 of a seal lock ring 22 which is rigidly secured to the rotating shaft 18 by three set screws 23 which extend through threaded apertures in the lock ring 22. The lock ring causes the sleeve 11, the lock sleeve 15, and the packing rings 16 and 17 to rotate with the shaft 18. Since the packing rings are immovable with respect to the shaft 18, they easily prevent, under the force exerted by the coil spring 19, the leakage of fluid between the seal sleeve 11 and the shaft 18.

The seal sleeve 11 also has an outwardly extending annular flange 24 disposed in the same vertical plane as the inwardly extending annular flange 12. A seal ring 25 of carbon or other material providing a smooth, hard anti-friction surface for the seal face 26 is press fitted on the seal sleeve 11 to abut the flange 24 and be immovable with respect to the seal sleeve. If desired, the inner face of the flange 24 could be machined to provide the necessary smooth seal face, such as seal face 27, and in that event the seal ring 25 could be dispensed with.

A blank gland 28 has a central aperture in which is press fitted a bushing 29 also of carbon or other material providing a smooth hard anti-friction surface for the seal face 31. The bushing 29 is immovable with respect to the blank gland 28. It will be noted that the bushing 29 fits over the sleeve 11 and that the sleeve 11 rotates therein as will be described below.

The blank gland 28 is provided with a pair of apertures 32 through which may extend bolts to fasten the blank gland to a housing (not shown) as is conventional in the art. A gasket (not shown) is interposed between the blank gland and the housing to prevent leakage of fluid therebetween.

A tension gland 33 has a central aperture in which is press fitted a bushing 34 of carbon or other material providing a smooth anti-friction face 35. The bushing 34 is immovable with respect to the tension gland 33 and is also rotatably mounted on the seal sleeve 11. The anti-friction face 35 of the bushing 34 bears against the face 36 of an adjustment ring 37 rigidly secured to the ring sleeve 11 adjacent the end having the slots 13 by a set screw 38 which extends through a threaded aperture in the adjustment ring.

Four adjustment studs 39 have threaded ends which extend into threaded apertures in the blank gland and are locked immovably to the blank gland by nuts 40. The unthreaded ends of the studs extend through suitable apertures 41 in the tension gland 33. A coil spring 42 is disposed about each stud 39 and bears against its associated nut 40 and the tension gland to bias the tension gland 33 away from the blank gland. It will be noted that this biasing force will also force the seal ring 25 toward the seal face 31 of the bushing 29 and the face 35 of the bushing 34 toward the face 36 of the adjustment ring 37, since the bushings 29 and 34 have enlarged portions forming flanges 47 and 44, respectively, which abut remote sides of the glands 28 and 33, respectively. It will also be noted that movement of the adjustment ring 37 toward the blank gland 28, and the concomitant movement of the tension gland toward the blank gland, will increase the biasing force of the springs 42. The studs 39 force the tension gland to remain immovable with respect to the blank gland.

In assembling the fluid seal 10, the seal ring 25 is press fitted on the seal sleeve 11. The blank gland 28, which has already been provided with its bushing 29, is then placed in position on the seal sleeve. Next, the springs 42 are placed on the studs 39 and the tension gland 33, already provided with its bushing 34, is placed on the seal sleeve and moved toward the blank gland until the studs 39 enter the apertures 41 in the tension gland. The adjustment ring is then placed on the seal sleeve and locked in position by the set screw 38. The packing rings 16 and 17 and the spring 19 are then placed within the seal sleeve and locked in position by the lock sleeve 15. These components now form a unit which may be easily mounted on the shaft 18.

The lock ring 22 may be rigidly mounted on the shaft 18 by the set screws 23 and the assembled unit is then placed on the shaft and moved toward the lock ring. The lugs 21 of the lock ring will enter into the slots 13 and 20 of the seal sleeve 11 and the lock sleeve 15, respectively. The blank gland will then be disposed adjacent the housing of the boat, pump or other machine and will be rigidly secured to such housing by bolts. A gasket will be employed to prevent leakage between the blank gland and the housing.

The seal ring 25 and the bushing 29 will be exposed to fluid but their seal faces 26 and 31, respectively, will be held in very close contact since the springs 42 will urge the tension gland 33 away from the blank gland. The fluid will therefore not be able to leak between these seal faces even though the seal ring 25 rotates with the sleeve 11 while the bushing 29 is stationary. The adjustment ring 37 also rotates with the seal sleeve 11 while the bushing 34 is stationary. The faces 35 and 36 of the bushing 34 and the adjustment ring 37, respectively, are therefore made smooth to reduce friction.

As the shaft is rotated in use, the seal faces 26 and 31 wear away constantly even though very slowly. The springs 42 will cause the sleeve 11 to move to the right, Figure 1, as such wear occurs so that the seal faces are always maintained in close contact. This may be characterized as an in-motion adjustment of the seal 10. When the seal faces have worn to such an extent that the springs 42 no longer exert a force sufficiently great to keep the seal faces in fluid-tight contact due to displacement of the tension gland away from the blank gland, the adjustment ring 37 may be loosened and moved toward the flange 24 to compress the springs 42 to a greater extent. After the adjustment ring is again rigidly secured to the seal sleeve, the seal faces will once more be forced together in fluid-tight contact. The adjustment ring 37, of course, can be adjusted only when the shaft 18 is not rotating. This therefore may be termed the idle adjustment. The faces 35 and 36 of the bushing 34 and the adjustment ring 37 will also wear due to the friction between them. The in-motion adjustment and the idle adjustment will of course compensate for the wear of these faces also.

Eventually, the seal ring, the bushings, and even the adjustment ring may become so worn that replacement is necessary. The gland 28 is then detached from the housing and the whole unit is moved to the left, Figure 1, and off the shaft. The unit can then be disassembled at a workbench or other convenient location. It is not necessary to take the fluid seal 10 apart, piece by piece, while it is on the shaft.

It will now be seen that a fluid seal has been shown and described which has been provided with an in-motion adjustment which compensates for the continuous wear of the seal faces 26 and 31, and an idle adjustment which compensates for extreme wear which cannot be compensated for by the in-motion adjustment. Moreover, a fluid seal has been revealed which can be removed and mounted on the shaft as a unit which facilitates installation and maintenance of the seal.

What is claimed is:

1. A fluid seal for a rotating shaft comprising, a seal sleeve having a central axis, an inwardly extending annular flange on said seal sleeve; a lock sleeve telescoped in one end of said seal sleeve and detachably secured thereto, said one end of said seal sleeve having an L-shaped slot and said lock sleeve having an outwardly extending pin adapted to be disposed in said slot detachably to secure the lock sleeve to said seal sleeve, a packing disposed in said sleeve between said downwardly depending annular flange and said lock sleeve for preventing passage of fluid between the shaft and said sleeve when said sleeve is concentrically disposed on said shaft; an outwardly extending flange on said seal sleeve providing a first seal face lying in a plane perpendicular to said central axis; an adjustment ring detachably and adjustably secured on said sleeve, said adjustment ring extending about said sleeve and being spaced from said outwardly extending flange; a blank gland on said seal sleeve between said outwardly extending flange and said adjustment ring having a bushing providing a second seal, said second seal face also lying in a plane perpendicular to said central axis; a tension gland mounted on said seal sleeve between said blank gland and said adjustment ring; means biasing said tension gland toward said adjustment ring and away from said blank gland for maintaining said seal faces in fluid-tight contact with one another; and means for attaching said seal sleeve to said shaft to prevent rotary movement of said seal sleeve about said shaft; said blank gland being adapted to be rigidly secured to a housing, said blank and tension glands being stationary while said seal sleeve rotates with said shaft.

2. A fluid seal for a rotating shaft comprising a lock ring rigidly attachable to the shaft; and a seal unit slidable on said shaft comprising a seal sleeve detachably engageable with said lock ring to lock said seal sleeve to said shaft to prevent rotary movement of said seal sleeve about said shaft, a packing secured within said seal sleeve for preventing passage of fluid between said shaft and said seal sleeve when said sleeve is concentrically disposed on said shaft; an outwardly extending flange on said seal sleeve providing a first radially extending seal face; an adjustment ring detachably and adjustably secured on said sleeve, said adjustment ring extending about said sleeve and being spaced from said outwardly extending flange; a blank gland on said seal sleeve between said outwardly extending flange and said adjustment ring having a bushing providing a second radially extending seal face, a tension gland mounted on said seal sleeve between said blank gland and said adjustment ring; means biasing said tension gland toward said adjustment ring and away from said blank gland for maintaining said seal faces in fluid tight contact with one another, said blank gland being adapted to be rigidly and detachably secured to a housing, said blank and tension glands being stationary while said sleeve rotates with said shaft, said seal unit being removable from the shaft when said blank gland is detached from the housing and said seal sleeve is detached from said lock ring.

3. A fluid seal for a rotating shaft comprising a securing means attachable to the shaft; and a seal unit slidable on the shaft comprising a seal sleeve detachably engageable with said securing means to lock said seal sleeve to said shaft to prevent rotary movement of said seal sleeve about said shaft, a packing secured within said seal sleeve for preventing passage of fluid between said shaft and said seal sleeve when said sleeve is concentrically disposed on said shaft; an outwardly extending flange on said seal sleeve providing a first radially extending seal face; an adjustment ring detachably and adjustably secured on said sleeve, said adjustment ring extending about said sleeve and being spaced from said outwardly extending flange; a blank gland on said seal sleeve between said outwardly extending flange and said adjustment ring having a bushing providing a second radially extending seal face, a tension gland mounted on said seal sleeve between said blank gland and said adjustment ring; means biasing said tension gland toward said adjustment ring and away from said blank gland for maintaining said seal faces in fluid tight contact with one another, said blank gland being adapted to be rigidly and detachably secured to a housing, said blank and tension glands being stationary while said sleeve rotates with said shaft, said seal unit being removable from the shaft when said blank gland is detached from the housing and said seal sleeve is detached from said securing means.

References Cited in the file of this patent

UNITED STATES PATENTS

| Number | Name | Date |
|---|---|---|
| 808,008 | Cagle | Dec. 19, 1905 |
| 1,399,421 | Cedervall | Dec. 6, 1921 |
| 1,618,882 | Kendall | Feb. 22, 1927 |
| 1,815,096 | Cedervall | July 21, 1931 |
| 2,247,505 | Kohler | July 1, 1941 |
| 2,383,862 | Hornschuch | Aug. 28, 1945 |
| 2,567,809 | Greiner | Sept. 11, 1951 |

FOREIGN PATENTS

| Number | Country | Date |
|---|---|---|
| 314,263 | Great Britain | of 1929 |